United States Patent [19]

Zehr

[11] Patent Number: 5,435,283
[45] Date of Patent: Jul. 25, 1995

[54] SWIRL CONTROL SYSTEM FOR VARYING IN-CYLINDER SWIRL

[75] Inventor: Randall L. Zehr, Columbus, Ind.

[73] Assignee: Cummins Engine Company, Inc., Columbus, Ind.

[21] Appl. No.: 178,868

[22] Filed: Jan. 7, 1994

[51] Int. Cl.$^6$ ............................................. F02B 31/00
[52] U.S. Cl. ................................. 123/306; 123/188.14
[58] Field of Search ............... 123/306, 188 M, 188.14

[56] References Cited

U.S. PATENT DOCUMENTS

| | | | |
|---|---|---|---|
| 4,466,394 | 8/1984 | Motosugi et al. | 123/188 M |
| 4,481,922 | 11/1984 | Sugiura | 123/306 |
| 4,612,903 | 9/1986 | Urabe et al. | 123/432 |
| 4,793,306 | 12/1988 | Swain | 123/308 |
| 4,998,518 | 3/1991 | Mitsumoto | 123/306 |
| 5,056,486 | 10/1991 | Johannes | 123/432 |
| 5,076,224 | 12/1991 | Smith, Jr. et al. | 123/188 M |
| 5,186,139 | 2/1993 | Matsura | 123/306 |

FOREIGN PATENT DOCUMENTS

| | | | |
|---|---|---|---|
| 56-88932 | 7/1981 | Japan | 123/306 |
| 57-91319 | 6/1982 | Japan | 123/306 |
| 57-108409 | 7/1982 | Japan | 123/306 |
| 58-28527 | 2/1983 | Japan | 123/306 |
| 62-7928 | 1/1987 | Japan | 123/306 |
| 2087480 | 5/1982 | United Kingdom | 123/306 |

OTHER PUBLICATIONS

SAE Technical Papers Series 871618, "Improvement of Diesel Engine Performance by Variable Swirl System", Sep. 14–17, 1987.
SAE Technical Papers Series 851210, "NOx Reduction is Compatible with Fuel Economy Through Toyota's Lean Combustion System", May 20–23, 1985.

*Primary Examiner*—David A. Okonsky
*Attorney, Agent, or Firm*—Sixbey, Friedman, Leedom & Ferguson

[57] ABSTRACT

The swirl control system is provided for varying the swirl of intake air in an internal combustion engine comprising a primary intake air passage for delivering a primary flow of intake air having an initial angular momentum corresponding to a low swirl energy level and a secondary intake air passage connected to the primary passage for directing a secondary air flow at a predetermined flow rate into the primary air flow to form a combined air flow having a combined angular momentum greater than the initial angular momentum of the primary air flow. The secondary air flow enters the primary passage substantially tangential, to the primary air flow so as to substantially avoid destructive interference with the primary air flow thereby minimizing pressure losses in the primary passage. A secondary air flow control valve for controlling the flow of secondary air into the primary passage is operable to vary the combined angular momentum so as to vary the swirl of intake air in the combustion chamber. The low swirl primary passage may be helically-shaped and the secondary passage may include a tubular channel portion either formed integrally with the primary passage or pivotally connected to the primary passage so that movement of the tubular portion varies the angle of the tubular portion with respect to the horizontal plane while maintaining the tangential relationship between the secondary and primary air flows.

13 Claims, 3 Drawing Sheets

SWIRL CONTROL SYSTEM FOR VARYING IN-CYLINDER SWIRL

TECHNICAL FIELD

This invention relates to a swirl control system for an internal combustion engine and, specifically, to an intake port arrangement which permits the swirl of intake air in an engine cylinder to be varied throughout the operating conditions of the engine thereby enhancing combustion and promoting fuel economy.

BACKGROUND OF THE INVENTION

Recent and upcoming legislation continues to place strict standards on emissions from internal combustion engines. As a result, various control systems have been designed and used to reduce the unwanted emissions while achieving efficiency of combustion and fuel economy. One such control system produces a swirling motion of the intake air entering the combustion chamber of the engine to aid in the mixing of the fuel and intake gases. This enhanced mixing in turn promotes optimal combustion thereby reducing emission levels in the exhaust gases. Some of these swirl control systems vary the amount of swirl energy in the intake air (thus the amount of swirl in the combustion chamber) based on the engine operating conditions. This interactive variation of swirl more effectively controls the emissions throughout the operating range of the engine. For example, in general, a high swirling motion of the air is needed in the combustion chamber at lower engine operating speeds in order to enhance the fuel/air mixing process while a lower swirling motion of the air is desirable at higher engine speeds during which the swirl energy needed to assist in the mixing process is reduced due to the increased energy derived from the incoming gases at the higher piston speeds.

Most of these variable swirl systems attempt to achieve a wide range of swirl energy levels by somehow changing the characteristics of the air flow which eventually enters the engine cylinder. For example, the variable swirl intake air control system disclosed in SAE Paper No. 871618 entitled "Improvement of Diesel Engine Performance by Variable Swirl System" includes a helically-shaped intake port formed around the intake valve on the top of an engine cylinder and a smaller "sub-port" attached to the helix or head of the helical intake port. The helical portion of the intake port imparts a high degree of angular momentum to the intake air prior to entering the cylinder thereby causing the intake air to possess a high swirl energy upon entering the cylinder. As a result, the main helical port functions to ultimately provide a large swirling motion to the intake air and therefore defines the upper limit of the desired swirl range. The sub-port concept relies on the principle of "destructive interference" of air flows in order to achieve the characteristic change necessary to achieve a wide range of swirl energy levels. The sub-port is connected to the helical port so as to direct air flowing through the sub-port into the helical portion against the flow of air in the helical port. The interaction of the air flow from the sub-port with the primary flow in the helical portion is destructive in nature and causes a net decrease in the annular momentum of the combined air flowing in the helical portion of the intake port. This reduction in the angular momentum within the helical portion of the intake port causes a drop in the swirl energy induced in the cylinder. Thus, the swirling effect is reduced as the air flow through the sub-port is increased. A similar intake port arrangement is disclosed in U.S. Pat. No. 4,466,394 wherein a swirl control valve is used to control the amount of air flowing through the sub-port. However, although effective in achieving a broad range of swirl energy levels, this type of swirl control arrangement suffers the penalty of large pressure losses which occur in a high swirl helical port thus resulting in decreased efficiency and reduced fuel economy. Although any helical intake port experiences pressure losses due to the turning of the intake air flow thru the duct, the swirl level (and therefore corresponding pressure loss) produced by a helical intake port can be controlled through proper design of the helix throat, entrance area and ramp angle. (In general, the higher the swirl level, the higher the pressure loss). Since the helical port alone must impart high swirl to the intake air at low engine speeds, the intake port of the above-discussed "sub-port" concept must be a high swirl design, thus resulting in unnecessarily large pressure losses. Moreover, the destructive nature of the air flowing from the sub-port into the helical portion during higher engine speeds creates additional undesirable pressure losses.

U.S. Pat. Nos. 4,612,903 to Urabe et al., 4,998,518 to Mitsumoto, 5,076,224 to Smith, Jr. et al. and 5,186,139 to Matsura, and SAE Paper No. 851210 all appear to disclose swirl control systems for engines which operate based on the destructive interference concept by using a control valve to vary the amount of air flowing from an auxiliary passage into a main passage. In each instance, the opening of the control valve permits more air through the auxiliary passage and results in a decrease in the swirling effect in the cylinder. Conversely, when the valve closes, the swirling effect increases. Therefore, these systems also cause increased pressure losses in the main passage due to the destructive force of the incoming air from the sub-port. Moreover, these systems all include main passages which alone create high swirling effects at low speeds/loads and, therefore, create undesirable pressure losses.

U.S. Pat. Nos. 4,481,922 to Sugiura and 5,056,486 to Johannes both disclose intake port structures which create strong swirls in the cylinder. The Sugiura patent discloses an intake port arrangement which uses a primary pipe to produce strong swirls in the combustion chamber at low loads and a secondary pipe, which joins with the primary pipe, to admit additional air at higher loads. Thus, the primary pipe is of a design which produces high swirls at low loads and therefore also creates high pressure losses. Moreover, since the secondary pipe does not direct secondary air tangentially into the air flow of the primary pipe, this design necessarily results in some degree of destructive interference and therefore pressure losses, as the secondary air collides with, and disrupts, the primary flow of air. The patent to Johannes discloses an intake port arrangement wherein a plurality of intake ports are separately connected to the cylinder head and opened sequentially as engine speed increases to create an even unidirectional swirl in the cylinder at any given engine speed. However, Johannes does not recognize the use of a helical port for creating a low swirl in the cylinder by imparting a pre-cylinder angular momentum in the intake air. Moreover, the Johannes design creates an uninterrupted continuous strong swirl turbulence throughout all engine speeds and therefore fails to recognize the importance of creating high swirl at low engine speeds while varying the swirl based on engine operating conditions.

Another example of a swirl control system is disclosed in U.S. Pat. No. 4,793,306 wherein an intake port is provided with an air nozzle positioned at an acute angle with respect to the plane of the top of the cylinder. The nozzle is operated to deliver a high speed flow of air across the intake valve opening so as to create a swirl of air in the cylinder especially during light load operation of the engine. The nozzle can also be partially or completely closed during heavy load operation to allow the main flow of air to be supplied primarily by the intake port. However, Swain relies on the nozzle to create the swirl in the cylinder and therefore does not recognize the use of a low swirl helical port to create a pre-cylinder angular momentum in the intake air which can be varied to vary the in-cylinder swirl while minimizing pressure losses in the helical port. Also, the nozzle disclosed in Swain appears to be connected to the intake passage in such a manner so as to cause the air flowing from the nozzle to collide with the intake air flowing through the intake passage causing destructive interference and undesirable pressure losses. Moreover, as a result, in order to increase the swirl using a nozzle connected apparently perpendicular to the intake passage, the Swain design requires an unnecessarily large, high speed flow air from the nozzle.

Thus, the prior art fails to disclose a swirl control system which simply and effectively controls the swirling effect in an engine cylinder throughout a wide range of engine operating conditions by varying the pre-cylinder swirl energy of the intake air while minimizing the pressure losses along the intake port.

SUMMARY OF THE INVENTION

It is an object of the present invention to provide an intake air arrangement and control system which enhances the fuel/air mixing process in the combustion chamber of an internal combustion engine for reducing emission levels in the exhaust gases while improving combustion and fuel economy.

Another object of the present invention is to provide a system for controlling the swirl of intake gases in the combustion chamber based on the operating conditions of the engine.

Yet another object of the present invention is to provide a swirl control system for an internal combustion engine which minimizes the pressure of losses along the intake passage thereby promoting fuel economy.

A further object of the present invention is to provide a swirl control system using a primary intake air passage designed to deliver a primary flow of air with a low swirl energy level to the combustion chamber for creating a low level swirling effect in the chamber thereby minimizing pressure losses at high engine speeds requiring reduced swift.

Yet another object of the present invention is to provide a swirl control system which uses a secondary air intake passage to direct air into a primary air intake passage for controlling the swirling effect in the combustion chamber while minimizing pressure losses in the primary intake passage throughout the range of operating conditions.

A still further object of the present invention is to provide a swirl control system which advantageously creates a precylinder swirl in the intake passage by imparting an initial angular momentum to the intake air in the intake passage thereby providing an effective precylinder low swirl required for high engine operating conditions while minimizing the need for additional air from the secondary intake passage.

Another object of the present invention is to provide a swirl control system for effectively controlling the level of swirl in the combustion chamber by using a secondary intake passage for directing air into a primary intake passage wherein the amount of air from the secondary intake passage is minimized.

Yet another object of the present invention is to provide a swift control system which uses a helically-shaped primary intake port designed to impart an initial angular momentum corresponding to a low swirl energy level to the primary air flow thereby minimizing pressure losses through the helical port at all operating conditions.

It is still a further object of the present invention to provide a swirl control system using a secondary intake passage arranged to direct the secondary air flow tangentially into the primary air flow thereby minimizing any destructive interference caused by the collision of the secondary flow with the primary flow, thus, minimizing pressure losses.

These and other objects of the present invention are achieved by providing a swirl control system for varying the swirl of intake air in an internal combustion engine comprising a low swirl primary intake air passage for delivering a primary flow of intake air having a low swirl energy level to the combustion chamber of the engine, a secondary intake air passage connected to the primary passage for directing a secondary flow of intake air at a predetermined flow rate into the primary air flow to form a combined air flow and a secondary air flow control means for controlling the flow of secondary air into the primary intake air passage. The low swirl primary intake air passage is capable of imparting an initial angular momentum to the primary air flow corresponding to the low swirl energy level for producing a low swirling effect in the combustion chamber. The flow from the secondary air passage forms a combined air flow having a combined angular momentum greater than the initial angular momentum. The secondary air flow enters the primary intake air passage substantially tangential to the primary air flow so as to reduce pressure losses in the primary intake air passage. The secondary air flow control means is controlled to vary the combined angular momentum so as to vary the swirl of intake air in the combustion chamber. The control means is operable to increase the flow of secondary air flow for increasing the combined angular momentum to increase the swirl of intake air in the combustion chamber. The low swirl primary intake air passage may be helically-shaped and include an outer annular wall and an inner annular wall formed radially inward from the outer annular wall. The secondary intake air passage may include a tubular portion connected to the outer wall of the primary passage which extends from the outer annular wall at an acute angle to a horizontal plane extending across the combustion chamber. The tubular portion of the secondary intake air passage may be formed integrally with the outer annular wall of the primary passage. Alternatively, the tubular portion may be pivotally connected to the outer annular wall so that movement of the tubular portion varies the angle of the tubular portion with respect to the horizontal plane while maintaining the tangential relationship between the secondary and primary air flows.

DESCRIPTION OF THE PREFERRED EMBODIMENT

Figure 1:
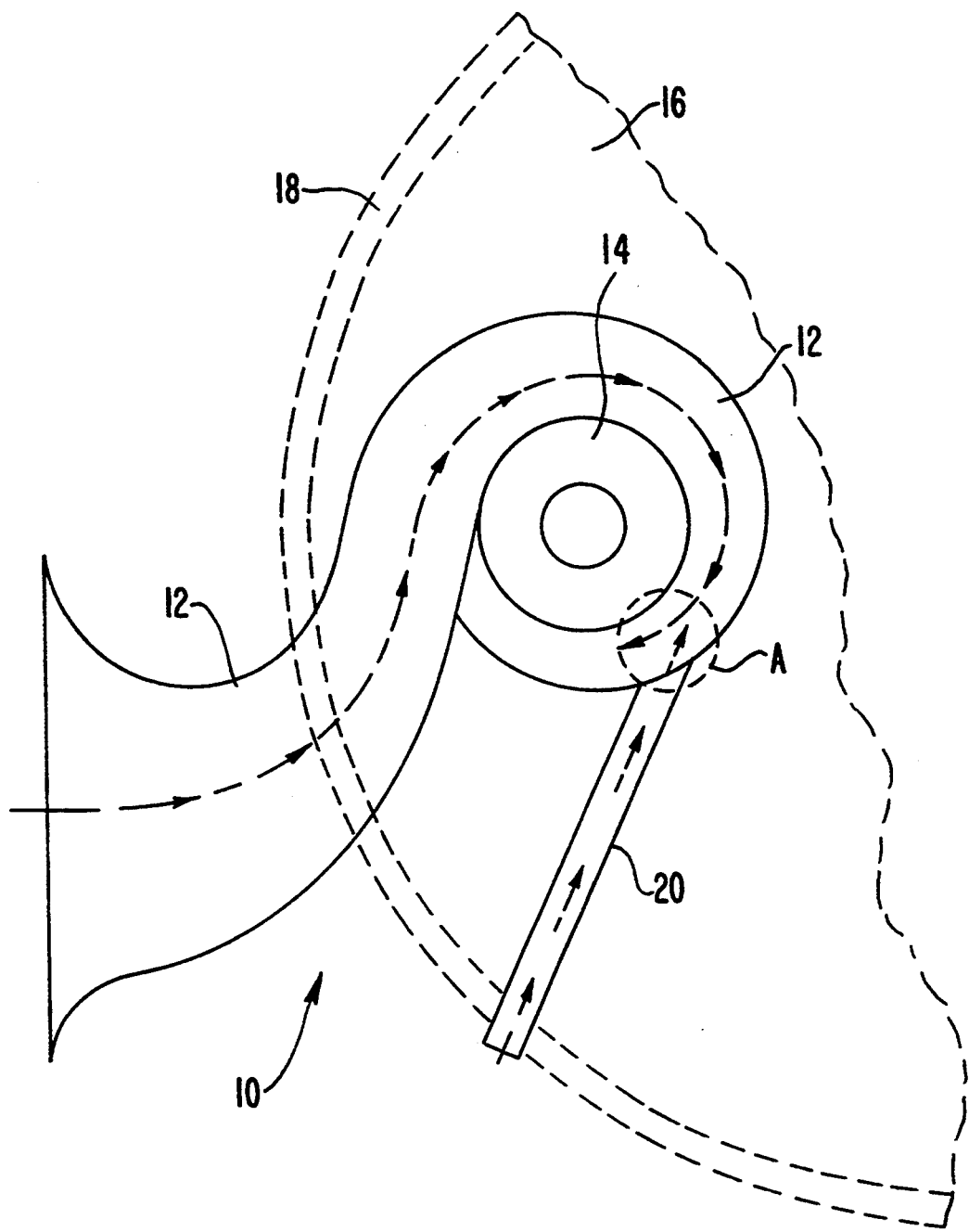
FIG. 1 is a plan view of a prior art "sub-port" type intake port arrangement.

As discussed hereinabove and illustrated in FIG. 1, one type of prior art swirl control system is the "sub-port" type indicated generally at 10 which includes a primary air intake passage such as helically-shaped port 12, for directing a primary flow of air through a valve opening 14 into the combustion chamber 16 defined, in part, by the engine cylinder 18. A sub-port 20 is connected to the helical port 12 so as to direct a secondary flow of air into the primary flow in the opposite direction as the primary flow so as to cause destructive interference with the primary flow. In this design, helical port 12 is designed to impart a large degree of angular momentum to the primary flow in port 12 so as to create a high swirling effect in the combustion chamber 16 which is usually beneficial at low load/low speed engine conditions to improve fuel/air mixing and enhance combustion. This high swirl design requirement of helical port 12 creates high pressure losses through helical port 12. In addition, in order to reduce the swirling effect at higher speeds as desired to maintain improved combustion, subport 20 is actuated to admit a secondary flow of air into the primary flow of helical port 12 so as to disrupt the flow thereby decreasing the angular momentum of the primary flow of air resulting in a combined air flow having a lower angular momentum and lower precylinder swirl energy level thereby reducing the swirling effect in the combustion chamber 16. However, this destructive interference with the primary flow also results in pressure losses in the region of helical port 12 indicated at A. Moreover, the destructive interference caused by the secondary flow creates unpredictable and inconsistent swirl patterns in helical port 12 and combustion chamber 18.

Figure 2:
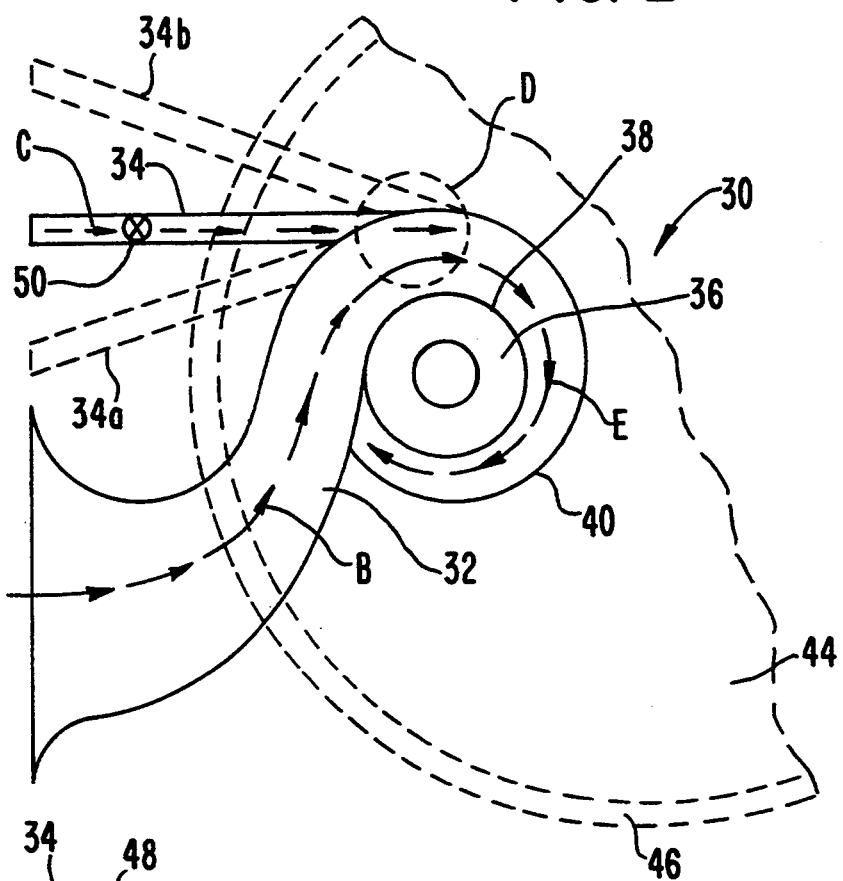
FIG. 2 is a plan view of the intake port arrangement and swirl control system of the present invention.

Referring to FIG. 2, the swirl control system of the present invention, indicated generally at 30, avoids the drawbacks of the prior art by providing a primary intake air passage, such as helically-shaped intake port 32, designed to impart an initial, low level angular momentum to the primary air flow, indicated by arrows B, in port 32 which corresponds to a low swirl energy level for producing a low level swirling effect in the combustion chamber as required during high load/high speed conditions. Swift control system 30 also includes a secondary intake air passage 34 for directing a secondary flow of air, indicated by arrows C, tangentially into the primary air flow of port 32 so as to cause constructive interaction in the region of port 32 indicated at D. This constructive interaction increases the angular momentum of the primary air flow resulting in a combined air flow, indicated by arrows E, having a combined angular momentum greater than the initial angular momentum of the primary air flow. This combined angular momentum translates into a higher swirl energy level which increases the swirling effect in the combustion chamber which is beneficial at low load/low speed engine conditions. Thus, secondary intake air passage 34 provides a secondary air flow which constructively combines with the primary air flow instead of destructively colliding with the primary air flow, thus, minimizing pressure losses when the secondary passage is used. Moreover, at higher engine speeds and loads when the secondary air passage 34 is normally not being used, helical port 32 need only provide a small angular momentum, corresponding to a low swirl energy level, to the intake air, thus, minimizing the pressure losses associated with redirecting intake air.

Figure 3:
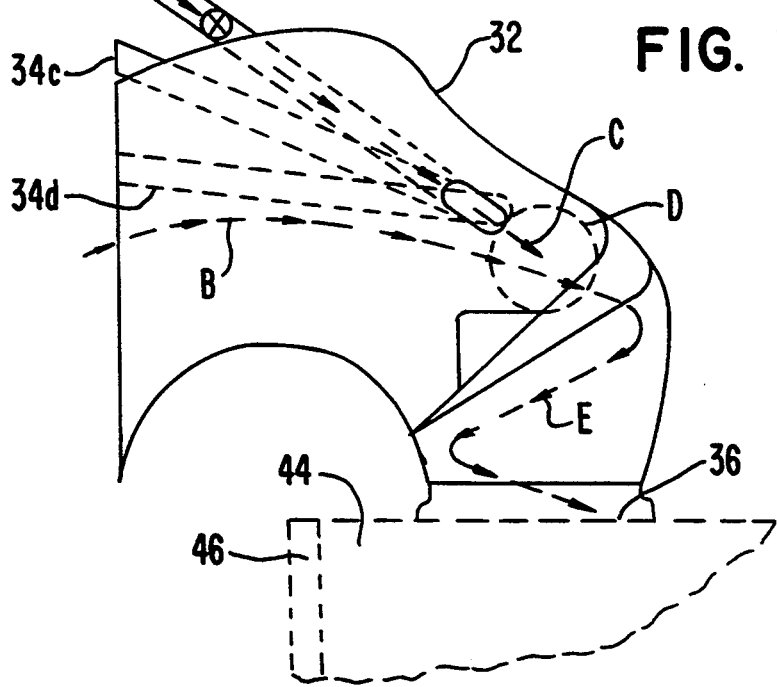
FIG. 3 is a side view of the swirl control system of the present invention in the direction of arrow III in FIG. 2.

Referring to FIGS. 2 and 3, helical port 32 of swirl control system 30 extends in a helical fashion around a valve opening 36 formed in a cylinder head (not shown). Helical port 32 may be cast integrally with the cylinder head or cast as a separate unit using conventional manufacturing techniques. Helical port 32 includes an inner annular wall 38 and an outer annular wall 40 extending helically around valve opening 36 for directing the primary air flow through helical port 32. The primary air flow is forced through helical port 32 in a helical path into a combustion chamber 44 formed by the cylinder/cylinder liner 46. Helical port 32 imparts a low level angular momentum to the primary air flow corresponding to a pre-cylinder low swirl energy level. Upon entering the combustion chamber, the low swirl energy level of the primary air flow causes the air flow to continue to swirl at a low level in the combustion chamber.

Figure 4:
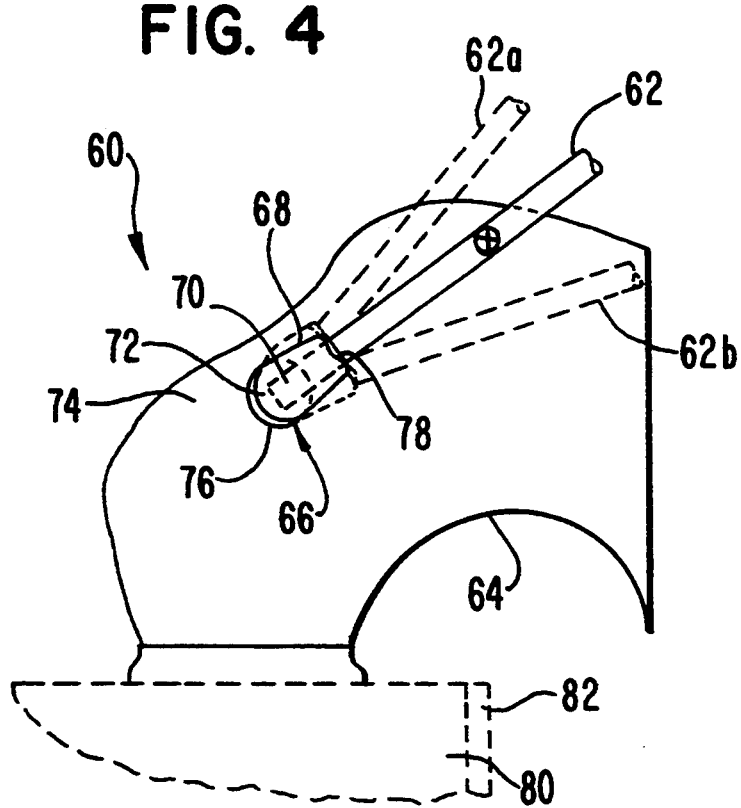
FIG. 4 is a side view of a second embodiment of the present invention in the direction of arrow IV in FIG. 5.
Figure 5:
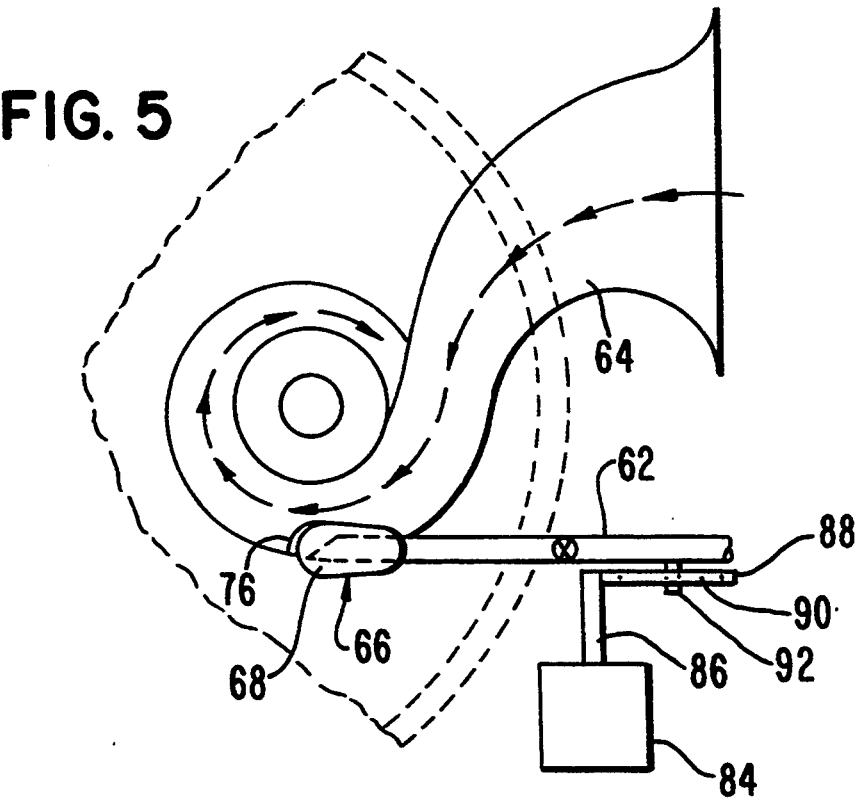
FIG. 5 is a plan view of the embodiment shown in FIG. 4 showing a means for positioning the swirl control valve.

As shown in FIGS. 2 and 3, secondary intake air passage 34 includes a tubular channel portion 48 extending tangentially adjacent, and connected to, outer annular wall 40 of helical port 32. Preferably, tubular channel 48 is formed integrally with helical port 32 in the cylinder head (not shown) so that channel 48 is fixed relative to wall 40. However, as discussed hereinbelow and as shown in FIGS. 4 and 5, channel 48 may be formed as a separate element and pivotably connected to outer wall 40. In both instances, channel 48 is positioned so as to direct the secondary air flow from channel 48 tangentially into the primary air flow so as to avoid disrupting the primary air flow. By minimizing any destructive interference between the primary and secondary air flows, the present invention enables the secondary air flow to constructively increase the initial angular momentum of the primary air flow to form a combined air flow having a greater angular momentum corresponding to a higher swirl energy level while also avoiding pressure losses caused by destructive interference between the secondary and primary air flows.

Swirl control system 30 also includes a secondary air flow control valve 50 for controlling the flow of secondary air through channel 48 into helical port 32. Control valve 50 may be positioned in channel 48 of secondary intake air passage 34 or alternatively upstream of channel 48. Control valve 50 may be any conventional flow control valve, such as a butterfly valve, operable to be placed in both open and closed positions and numerous positions therebetween. In any case, control valve 50 may be placed in a variety of positions so as to vary the flow through channel 48. Control valve 50 may be moved into a closed position completely blocking the flow of secondary air into helical port 32, thus, allowing helical port 32 to provide the primary air flow having a low swirl energy level. Positioning control valve 50 in a closed or blocking position is often desirable during high engine speed/load conditions wherein the swirl energy needed to assist in the mixing process of the gases is reduced due to the increased energy derived from the incoming gases at higher piston speeds. Therefore, the low swirl helical port 32 is capable of providing air flow having an adequate swirl energy necessary to accomplish complete combustion while insuring reduced emissions. As the engine speed/load decreases, control valve 50 may be gradually moved into a variety of partially opened or closed positions corresponding to the amount of combined angular momentum necessary to produce the final swirling effect in the combustion chamber required for improved combustion and reduced emissions at the particular engine operating level. At low loads and engine speeds, control valve 50 is normally open so as to permit a high flow of secondary air through channel 48 into helical port 32 tangential to the primary air flow, thus, creating a high swirling effect in combustion chamber 44. In this manner, control valve 50 can be positioned based on a variety of engine parameters to effect a multiplicity of swirl energy levels in the air flow entering the combustion chamber 44 thereby insuring enhanced combustion and reduced emissions throughout a broad range of engine operating conditions. Control valve 50 may be controlled by signals received from an electronic control unit (ECU) (not shown) based on various engine operating conditions, such as engine load, engine speed and any other operating parameter determined to be an important factor in determining the amount of fuel/air mixing necessary for improved combustion.

As shown in FIGS. 2 and 3, channel 48 may be connected to outer annular wall 40 in any one of a variety of locations around periphery of outer annular wall 40 as indicated by 34a and 34b. Regardless of the exact location of channel 48 around outer annular wall 40, it is very important that channel 48 be positioned so as to direct the secondary air flow tangentially into the primary air flow so as to minimize any destructive interference thereby minimizing pressure losses in helical port 32. In this manner, secondary intake air passage 34 can be used to accurately and predictably control the level of swirl in the combustion chamber 44 while maximizing efficiency and fuel economy. In addition, as shown in FIG. 3, channel 48 may be secured in a plurality of vertical positions with respect to the engine cylinder as represented by 34c and 34d. It is preferred that tubular channel 48 be positioned at an acute angle to the top horizontal plane of the cylinder 46 so as to direct the secondary air into the same generally downward flow of the primary air through helical port 32 downwardly into combustion chamber 44.

Referring now to FIGS. 4 and 5, a second embodiment of the swirl control system of the present invention is shown at 60 and includes basically the same features as shown in the previous embodiment except that a tubular channel 62 is pivotably connected to helical port 64 by a pivotal connection 66. Pivotal connection 66 includes a connector piece 68 through which an inner end 70 of channel 62 extends. An opening 72 formed in outer annular wall 74 of helical port 64 receives inner end 70. The inner annular end of connector piece 68 is sealingly connected to helical port 64 around opening 72 by an inner connector ring 76. An outer connector ring 78 securely and sealingly attaches the outer end of connector piece 68 to channel 62. Connector piece 68 is formed of a high temperature resistant material strong enough to support and maintain inner end 70 in a relatively constant position in opening 72 while permitting tubular channel 62 to be pivoted with respect to helical port 64. In this manner, pivotal connection 66 allows tubular channel 62 to be pivoted into a variety of positions indicated by 62a and 62b so as to vary the angle of tubular channel 62 relative to the top horizontal plane of combustion chamber 80 and cylinder 82. By changing the vertical angle of tubular channel 62 while maintaining the secondary air flow tangential to the primary air flow, this embodiment permits the secondary air flow from inner end 70 to be directed in a variety of tangential flow paths. For instance, the secondary air flow may be concentrated in the upper portion of the helix of helical port 64 or, alternatively, toward the lower wall of helical port 64. This dynamic arrangement provides for a variety of swirl flow patterns in combustion chamber 80.

As shown in FIG. 5, movement of tubular channel 62 may be accomplished by use of a servomotor 84 having a rotatable shaft 86 capable of rotating small, discrete angular distances. A link 88 is rigidly attached to the end of shaft 86 and extends outwardly adjacent channel 62. An elongated slot 90 formed in link 88 is sized to receive a pin 92 extending from, and rigidly connected to, tubular channel 62. Actuation of servomotor 84, based on signals from the ECU (not shown), causes a desired small rotation of shaft 86 in either the clockwise or counterclockwise direction causing a respective rotation of link 88. Rotation of link 88 forces pin 92 and channel 62 in the general direction of link 88 while pin 92 is permitted to move axially along link 88 in elongated slot 90. Thus, channel 62 may be moved into various positions in response to engine operating conditions so as to vary the secondary air flow path within helical port 64 while maintaining the tangential relationship between the secondary and primary air flows.

Industrial Applicability

The disclosed swirl control system for effectively controlling the swirl level of intake gases while minimizing pressure losses may be used on any internal combustion engine having intake valves for receiving air from an intake passage. In engines having multiple intake valves, the present swirl control system can be used with one of the intake passages, or separate swirl control systems may be used with each intake passage.

We claim:

1. A swirl control system for varying the swirl of intake air in an internal combustion engine having at least one combustion chamber, comprising:

a low swirl helically-shaped primary intake air passage for delivering a primary flow of intake air having a low swift energy level to the combustion chamber, said low swirl primary intake air passage capable of imparting an initial angular momentum to said primary air flow in said primary intake air passage corresponding to said low swirl energy level for producing a low level swirling effect in the combustion chamber;

a secondary intake air passage connected to said primary intake air passage for directing a secondary flow of intake air at a predetermined flow rate into said primary air flow so as to constructively interact with said primary air flow to form a combined air flow having a combined angular momentum greater than said initial angular momentum, said secondary air flow entering said primary intake air passage substantially tangential to said primary air flow;

a secondary air flow control means for controlling the flow of said secondary air flow into said low swift primary intake air passage to vary said combined angular momentum so as to vary the swirl of intake air in the combustion chamber while substantially avoiding destructive interference between said secondary air flow and said primary flow thereby minimizing air pressure losses through said low swirl helically-shaped primary intake air passage.

2. The swirl control system of claim 1, wherein said secondary air flow control means is operable to increase the flow of said secondary air flow for increasing said combined angular momentum to increase the swirl of intake air in the combustion chamber.

3. The swift control system of claim 2, wherein said primary intake air passage includes an outer annular wall and an inner annular wall formed radially inward from said outer annular wall, said secondary intake air passage including a tubular portion connected to said outer annular wall of said primary intake air passage.

4. The swirl control system of claim 3, wherein said tubular portion extends from said outer annular wall at an acute angle to a horizontal plane extending across the combustion chamber.

5. The swirl control system of claim 3, wherein said tubular portion is formed integrally with said outer annular wall.

6. The swift control system of claim 4, wherein said tubular portion is pivotally connected to said outer annular wall, said tubular portion pivotable so as to vary said acute angle.

7. A swift control system for varying the swift of intake air in an internal combustion engine having at least one combustion chamber, comprising:

a helically-shaped low swift primary intake air passage for delivering a primary flow of intake air to the combustion chamber, said helically-shaped primary air passage imparting an initial low swift energy level to said primary air flow resulting in a low level swirling effect in the combustion chamber;

a secondary intake air passage connected to said primary intake air passage for directing a secondary flow of intake air at a predetermined flow rate into said primary air flow so as to constructively interact with said primary air flow to form a combined air flow having a combined swirl energy level greater than said low swirl energy level, said secondary air flow entering said helically-shaped primary air passage substantially tangential to said primary air flow;

a secondary air flow control means for controlling the flow rate of said secondary air flow into said helically-shaped low swirl primary air intake passage to vary said combined swirl energy level while substantially avoiding destructive interference between said secondary air flow and said primary air flow thereby minimizing air pressure losses through said helically-shaped low swirl primary intake air passage.

8. The swirl control system of claim 7, wherein said secondary air flow control means is operable to increase said flow rate of said secondary air flow so as to increase said combined swirl energy level.

9. The swirl control system of claim 8, wherein said low swirl primary intake air passage includes an outer annular wall and an inner annular wall formed radially inward from said outer annular wall, said secondary intake air passage including a tubular portion connected to said outer wall of said low swirl primary intake air passage.

10. The swirl control system of claim 9, wherein said tubular portion extends from said outer annular wall at an acute angle to a horizontal plane extending across the combustion chamber.

11. The swirl control system of claim 9, wherein said tubular portion is formed integrally with said outer annular wall.

12. The swirl control system of claim 10, wherein said tubular portion is pivotally connected to said outer annular wall, said tubular portion pivotable so as to vary said acute angle.

13. A swirl control system for varying the swirl of intake air in an internal combustion engine having at least one combustion chamber, comprising:

a low swirl helically-shaped primary intake air passage for delivering a primary flow of intake air having a low swirl energy level to the combustion chamber, said low swirl primary intake air passage capable of imparting an initial angular momentum to said primary air flow in said primary intake air passage corresponding to said low swirl energy level for producing a low level swirling effect in the combustion chamber;

a secondary intake air passage connected to said primary intake air passage for directing a secondary flow of intake air at a predetermined flow rate into said primary air flow to form a combined air flow having a combined angular momentum greater than said initial angular momentum, said secondary air flow entering said primary intake air passage substantially tangential to said primary air flow;

a secondary air flow control means for controlling the flow of said secondary air flow into said low swift primary intake air passage to vary said combined angular momentum so as to vary the swift of intake air in the combustion chamber while minimizing air pressure losses through said low swirl helically-shaped primary intake air passage; said secondary air flow control means being operable to increase the flow of said secondary air flow for increasing said combined angular momentum to increase the swift of intake air in the combustion chamber;

wherein said primary intake air passage includes an outer annular wall and an inner annular wall formed radially inward from said outer annular wall, said secondary intake air passage including a tubular portion connected to said outer annular wall of said primary intake air passage.

* * * * *